United States Patent [19]
Girardi et al.

[11] Patent Number: 5,714,108
[45] Date of Patent: Feb. 3, 1998

[54] METHOD OF MANUFACTURING A BICYCLE SADDLE

[75] Inventors: Antonio Girardi, Rossano Veneto; Gianni Zago, San Quirino, both of Italy

[73] Assignee: Selle San Marco di Girardi Comm. Luigi S.p.A., Rossano Veneto, Italy

[21] Appl. No.: 605,696

[22] Filed: Feb. 22, 1996

[30] Foreign Application Priority Data

Feb. 22, 1995 [IT] Italy ................... TO95A0127

[51] Int. Cl.$^6$ .............. B62J 1/18; B29K 105/00; B29C 69/02
[52] U.S. Cl. ............ 264/331.17; 29/447; 156/85; 264/342 R; 264/DIG. 71; 297/214
[58] Field of Search .................. 29/447; 297/214, 297/452.48; 156/84, 85; 264/331.15, 331.17, 342 R, DIG. 71

[56] References Cited

U.S. PATENT DOCUMENTS

| | | |
|---|---|---|
| 3,284,258 | 11/1966 | Patti et al. ................... 29/447 |
| 4,772,069 | 9/1988 | Szymski ................... 297/214 |
| 4,793,607 | 12/1988 | Suellentrop ................... 297/273 |
| 5,348,369 | 9/1994 | Yu ................... 297/214 |
| 5,435,865 | 7/1995 | Lee et al. ................... 264/342 R |

FOREIGN PATENT DOCUMENTS

| | | | |
|---|---|---|---|
| 2368394 | 5/1978 | France . | |
| 55-257 | 1/1980 | Japan | 156/85 |
| 55-055834 | 4/1980 | Japan . | |
| 57-8112 | 1/1982 | Japan | 156/85 |
| 426788 | 4/1935 | United Kingdom | 264/342 R |
| 2168606 | 6/1986 | United Kingdom | 156/85 |

*Primary Examiner*—Robert Davis
*Attorney, Agent, or Firm*—Sughrue, Mion, Zinn, Macpeak & Seas, PLLC

[57] ABSTRACT

A saddle includes a body of thermoplastic material constituting a load-bearing structure on which a padding of expanded plastics material is fitted. The padding is made of an ethylene vinyl acetate copolymer which does not require the application of a covering layer. The padding is formed by injection moulding and allowed to expand to a size larger than the final size. The padding is then placed on the load-bearing structure and is firmly coupled to the load-bearing structure upon cooling and shrinking.

2 Claims, 1 Drawing Sheet

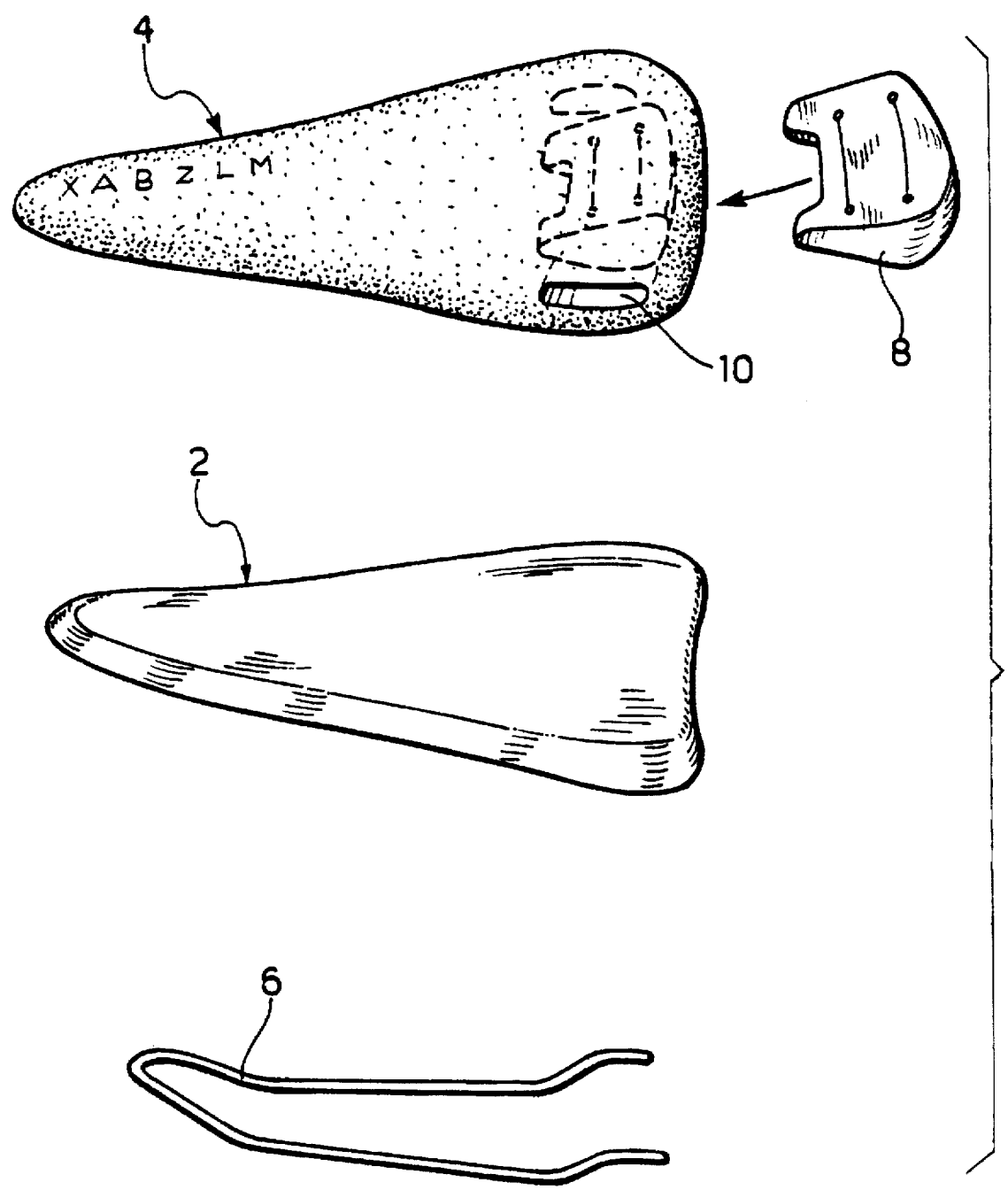

METHOD OF MANUFACTURING A BICYCLE SADDLE

BACKGROUND OF THE INVENTION

The present invention relates to a bicycle saddle and to a method for its manufacture.

At the moment, a saddle for a road cycle or for a mountain bike consists of a body which constitutes its load-bearing structure, a padding, a covering and, in some cases, a second body for anchoring the edges of the covering.

The production sequence for a conventional saddle is basically as follows:
- production of the body by the injection of thermoplastic material such as, for example, polypropylene,
- production of an expanded polyurethane padding by the injection of a mixture of isocyanate, polyol and expanding gas into a mould,
- gluing of the padding to the body,
- covering of the padding with leather (for the more expensive versions) or synthetic fabrics (for the cheaper models); in this second case the incomplete adhesion of the covering material to the body in the lower portion thereof necessitates the use of a further plastics component called a second body,
- the insertion of a fork-shaped metal element in suitable seats provided in the body.

A saddle thus designed has many limitations, both functional and aesthetic, and has a high production cost due to a high cost resulting from the amount of labour required for the covering of the padding which is a slow, wholly manual operation. The covering greatly affects the unit cost of the saddle whether it is made of natural leather, in which case there is a high raw-material cost, or of cheaper synthetic material but, in this second case, it is necessary to use a further component (the second body) to compensate for the incomplete adhesion of the material to the body.

A further disadvantage of known saddles is that it is impossible to introduce into the structure of the saddle (for example, between the body and the padding, between the padding and the covering, or on the covering, in relief or flat) a series of marks and writing useful for promoting the product and, in particular, accessories which improve the quality and comfort of the product such as, for example, shock-absorbing air cushions or inserts containing liquids.

SUMMARY OF THE INVENTION

In order to overcome the aforementioned disadvantages, the subject of the present invention is a bicycle saddle comprising a body of thermoplastic material constituting a load-bearing structure on which a padding of expanded plastics material is fitted, characterized in that the padding is made of an ethylene vinyl acetate copolymer.

The main advantage of this material is that its outer surface has an aesthetic finish which does not require a covering. With the saddle according to the invention, the lengthy and expensive manual operations necessary for the conventional expanded polyurethane paddings are thus unnecessary.

Ethylene vinyl acetate is lighter and has better vibration-damping properties than the polyurethane used up to now. It is a material which can be painted, can easily be glued and has good resistance to abrasion and to external agents, for which reasons it does not require a protective covering.

According to the invention, the method of manufacturing the saddle may provide for a step for the injection moulding of the padding from ethylene vinyl acetate copolymers in granules.

Alternatively, the padding may be produced by the die-cutting and thermoforming of previously moulded ethylene vinyl acetate sheets. It is very easy, in the course of the thermoforming of the sheet material, to define seats for inserts or cushions for forming regions of different density in the padding of the saddle.

BRIEF DESCRIPTION OF THE DRAWINGS

Further characteristics and advantages of the present invention will become clear in the course of the following detailed description given purely by way of non-limiting example, with reference to the appended drawing which is an exploded perspective view of a saddle according to the invention.

DETAILED DESCRIPTION OF THE INVENTION

With reference to the drawing, the saddle according to the present invention is constituted essentially by a body 2 of injection-moulded thermoplastic material and by a padding 4 made of an ethylene vinyl acetate copolymer.

The method of manufacture provides for the body 2 to be manufactured by injection moulding of thermoplastic material according to known technology. The padding 4 is produced separately in the manner which will be explained below and the padding 4 is then fitted onto the body 2 by gluing. A metal element 6 known as a fork is then fitted on the body 2, in known manner.

The polymer constituting the padding 4 is a closed-cell, cross-linking expanded material which is highly resistant to aging and does not require covering. The product can be glued effectively with suitable adhesives after surface roughening or abrasion. The material may have the desired coloration and may also be painted with suitable paints.

The following table gives the properties of polymers of the two types which have been found particularly advantageous for forming padding for bicycle saddles.

TABLE 1

| PROPERTIES | METHOD | UNIT OF MEASUREMENT | POLYMER 1 | POLYMER 2 |
|---|---|---|---|---|
| DENSITY | DIN 53457 | g/cm$^3$ | 0.3 | 0.22 |
| HARDNESS | DIN 53505 | Shore A | 55 | 42 |
| ABRASION RESISTANCE | DIN 53516 | mm$^3$ | 180–200 | 350 |
| BREAKING LOAD | DIN 53504 | MPa | 3.5 | 2.2 |
| EXTENSIBILITY | DIN 53504 | % | 300% | 320% |
| COMPRESSION SET 24 h-23° C. | DIN 53517 | % | 18 | 18 |

Suitable materials having the aforementioned properties are, for example, products of the company A.P.I. S.p.A. of Mussolente (Vicenza) and are marketed under the trade mark "APIZERO".

A first technique usable for the manufacture of the padding 4 consists of the injection of the ethylene vinyl acetate polymer into suitable moulds by a technique similar to that used for thermoplastic materials. The starting material is the polymer in granules which is supplied to an injection cylinder where it forms a fused mass at a temperature of the order of 100° C. The injection pressure is 100–400 bars and the time spent in the mould is of the order of 4–6 minutes.

The mould has to be kept at a cross-linking temperature of the used copolymer typically 175°–185° C.

The EVA moulding cycle, which is similar to that for the injection of common thermoplastic resins, provides for the component to be moulded with dimensions of about 70% of its actual size. As soon as it is out of the mould, the component absorbs air and reaches dimensions of about 110%, after which, in the course of the 3–5 minutes required for it to cool, it reaches the predetermined size, taking up its final measurements.

Use can be made of these physico-mechanical temporary size-change characteristics in order to fit the EVA covering on the body when its size is 110% of its final size so that, as it cools, it can tighten with force around the body, creating an ideal mechanical coupling which is resistant to stresses, without gluing operations.

Alternatively, the padding 4 can be produced by thermoforming, starting with previously-produced ethylene vinyl acetate sheets of the desired density, thickness and colours. The sheets thus obtained are die-cut according to the design of the saddle to be covered and placed in an oven for a time and at a temperature which are predetermined experimentally. After this heating stage, the blank is placed in a suitable mould where it is left to cool until the desired shape is produced. During this operation it is possible, with the use of forms, to create seats for housing cushions or inserts of the type indicated 8 in the drawing, containing shock-absorbing fluids such as, for example, air or liquids.

The sequence for the production of the padding starting from ethylene vinyl acetate sheets is advantageous particularly because it enables any type of cutting, die-cutting, and insertion in the padding to be carried out directly and visually. It is thus extremely easy to form writing or ornamental designs in general, either in relief or engraved in the padding. It is also possible very easily to form windows of the type indicated 10 in the drawing, which render the shock-absorbing systems incorporated in the padding visible from outside, which is of considerable importance from the point of view of the promotion of the product.

What is claimed is:

1. A method for the manufacture of a saddle, wherein said method comprises the steps of:

producing a body constituting a load-bearing structure for a padding, forming a padding from a padding material constituted by an ethylene vinyl acetate copolymer by adding said material to a heated mould and applying pressure;

removing said padding from the mould whereby the padding expands temporarily to reach a size larger than its final size, fitting said padding onto said body whilst said padding is larger than its final size so as to achieve firm coupling between said body and said padding when said padding has shrunk to its final size as a result of its cooling.

2. A method for the manufacture of a saddle according to claim 1, wherein the padding is formed by injection moulding from granules of ethylene vinyl acetate polymer.

\* \* \* \* \*